United States Patent [19]

Gee

[11] Patent Number: 5,452,779
[45] Date of Patent: Sep. 26, 1995

[54] DUAL PISTON HYDRAULIC CYLINDER FOR CLUTCH AND UPSHIFT BRAKE ACTUATOR

[75] Inventor: Thomas A. Gee, Allen Park, Mich.

[73] Assignee: Eaton Corporation, Cleveland, Ohio

[21] Appl. No.: 203,422

[22] Filed: Mar. 1, 1994

[51] Int. Cl.$^6$ .......................... B60K 41/24; F16D 67/04
[52] U.S. Cl. .................. 192/13 R; 60/562; 192/12 C
[58] Field of Search .................. 192/13 R, 12 C, 192/111 A; 60/576, 575, 562

[56] References Cited

U.S. PATENT DOCUMENTS

| | | |
|---|---|---|
| 1,165,230 | 12/1915 | Degen . |
| 1,176,244 | 3/1916 | Redlich . |
| 1,374,413 | 4/1921 | Webb . |
| 1,435,732 | 11/1922 | Pierce . |
| 1,692,390 | 11/1928 | Smith . |
| 1,764,752 | 6/1930 | Rodger . |
| 1,996,256 | 4/1935 | Price et al. . |
| 2,285,557 | 6/1942 | Berglund ............................ 192/13 R X |
| 3,203,187 | 8/1965 | Randol ................................... 192/13 R |
| 3,462,200 | 8/1969 | Lewis et al. ........................... 60/562 X |
| 3,522,706 | 8/1970 | Bueler ......................................... 60/562 |
| 3,844,121 | 10/1974 | Griesenbrock ............................ 60/562 |
| 3,866,727 | 2/1975 | Myers . |
| 3,963,107 | 6/1976 | Bolger . |
| 4,299,314 | 11/1981 | Parsons et al. ......................... 192/12 C |
| 4,617,885 | 10/1986 | Oshiro et al. . |
| 4,632,014 | 12/1986 | Endo . |
| 4,668,207 | 5/1987 | Koshimo . |
| 4,693,354 | 9/1987 | Umeyama et al. . |
| 4,926,994 | 5/1990 | Koshizawa et al. . |
| 4,947,972 | 8/1990 | Lea . |
| 5,009,301 | 4/1991 | Spitler . |
| 5,018,353 | 5/1991 | Rugh ............................................ 60/562 |
| 5,349,820 | 9/1994 | Yanagi et al. .............................. 60/562 |

FOREIGN PATENT DOCUMENTS 5275731 6/1977 Japan .................. 192/109 F

Primary Examiner—Rodney H. Bonck
Attorney, Agent, or Firm—Brooks & Kushman

[57] ABSTRACT

A dual piston hydraulic cylinder for actuating a clutch and an upshift brake in a heavy-duty vehicle is provided which achieves consistent, selectable, sequential, and controllable operation utilizing a single control pedal. A preloaded spring located between two pistons sequences the pressure accumulation and fluid flow to actuate the clutch and the upshift brake in such a manner so as to preclude brake actuation unless the clutch is disengaged. A fluid reservoir in selective fluid communication with the hydraulic cylinder automatically adjusts the separate fluid links between the clutch and the upshift brake to compensate for changes in their corresponding engaged positions due to wear. The apparatus disclosed accommodates the use of disparately designed clutches and upshift brakes.

8 Claims, 2 Drawing Sheets

DUAL PISTON HYDRAULIC CYLINDER FOR CLUTCH AND UPSHIFT BRAKE ACTUATOR

TECHNICAL FIELD

The present invention relates to an apparatus and method for controlling the actuation of a master clutch and an upshift brake using a dual piston hydraulic cylinder.

BACKGROUND ART

A master clutch functions as a releasable coupling between engine and transmission components in a motor vehicle. A typical clutch consists of driving discs which are forced together by a spring to squeeze a driven disc located between them. The driven disc is typically lined with friction material. The driving discs are attached to the engine output while the driven disc is attached to the transmission input shaft. Most applications utilize actuating levers which apply an axial force to the rotating discs to engage the clutch. Many actuating levers require a large range of motion for a comparatively small amount of disc motion to deliver a sufficient force to the clutch. For example, a typical ratio of lever motion to disc motion is 60:1 in many foot-actuated clutch installations.

When the clutch is being engaged, the actuator levers allow the discs to contact each other and, depending on the net interface force, a coupling torque is generated. The driving and driven discs slip against each other until the coupling torque is sufficient to couple the discs such that they rotate at substantially the same speed. This slipping condition occurs frequently during normal operation of a vehicle, such as when initiating vehicle motion.

As is well known, slipping the clutch wears the engaging surfaces resulting in a reduction of the steady-state thickness of the discs. The slipping also creates heat which causes a transient expansion of the clutch discs and friction material. Therefore, on subsequent clutch engagements, the distance the driving disc must travel toward the driven disc to generate the same force and resultant coupling torque varies depending on the temperature and wear state. Due to the magnitude of the travel ratio, what may appear to be a small amount of wear or heat expansion will substantially alter the force, travel, and position characteristics of the actuator.

It is desirable for the input mechanism to have a substantially constant force versus position relationship so that an operator can consistently control the clutch throughout the usable life of the clutch, regardless of the type of operator. For example, a clutch may be controlled by a human operator, or by a robotically or mechanically operated mechanism, either of which may employ a traditional foot pedal lever or a servomotor shaft connection.

Consistent clutch operation, then, necessitates adjusting the position of some part of the control actuator as the friction interfaces wear. Several kinds of adjustment mechanisms have been adopted to provide this functionality. They include devices with threaded rods to manually modify the effective lengths of a mechanical clutch linkage as well as automatic or self-adaptable column lengths of hydraulic fluid between the pistons of hydraulic actuation systems. The various adjustment systems have advantages and disadvantages. For example, a threaded rod adjuster is relatively simple and inexpensive but is often located near the rotating members of the clutch. Thus, these devices are difficult to adjust due to their poor accessibility in the clutch assembly.

Certain transmission systems, generally known as layshaft systems, impose additional control constraints upon the clutch actuator apparatus. These transmissions provide for multiple gear ratios by selectively engaging and disengaging gear teeth or dog clutch teeth. Preferably for these transmissions, the teeth to be engaged are rotating at substantially the same mating speed. This allows the edges of the teeth to physically engage each other while avoiding breakage, wear, and wear products attendant to raking collisions among the mating teeth.

When the transmission is in a neutral gear with the engine running and the master clutch is subsequently disengaged, the driven members tend to remain rotating due to their inertia. This inertia is relatively large in heavy-duty powertrain applications, such as in class 7 and class 8 trucks, since these vehicles contain large, massive components to accommodate their high torque demands. Additionally, clutch drag torque often causes the transmission input shaft to rotate at, or near, engine speed. This drag torque is due to spurious contact between the driving and driven discs and, in heavy-duty applications, is frequently 10 foot-pounds or more.

The residual rotation after the clutch is disengaged prolongs the time required to complete a gear shift in the transmission. This time may be significant in a heavily loaded vehicle ascending an incline. Under these conditions the loss in vehicle speed, while waiting for the input to slow down to the proper engagement speed for the next ratio, may preclude the desirability to complete the shift. The time period may also have a cumulative effect in that heavy-duty applications frequently require as many as fifteen shifts before reaching highway speeds. Therefore, it is desirable to provide a means to control the speed of the driven members after the clutch is fully disengaged.

To provide this control, layshaft transmissions are usually equipped with specialized brakes that overcome the residual rotation related to clutch drag and/or inertia torque. Some applications, such as the Roadranger® or Twinsplitter® transmissions, manufactured by the assignee of the present invention, include brakes which are removable, serviceable devices actuated interactively with clutch disengagement. The devices are generically referred to as clutch brakes, inertia brakes, or upshift brakes.

The robustness of a clutch brake varies depending upon its intended application. For light-duty applications, such as for use in engaging a starting gear without raking the dog clutches, a simple plastic or bronze piston, forced into the periphery of a primary drive gear, is sufficient. For more severe applications, such as the upshift brake incorporated into a Twinsplitter® transmission, a multiple disc brake is utilized to accommodate high torque and the resulting thermal capacity necessary for proper operation. This type of upshift brake is typically actuated by fluid pressure, such as hydraulic or pneumatic pressure, and is connected to the input shaft through a primary drive gear of the transmission.

The operator indicates a desire to utilize the upshift brake by extending the clutch actuator travel beyond a detent position. The detent position corresponds to the point of complete disengagement of the master clutch. The fully extended clutch actuator may activate a switch, a control valve, and a pressure source which is used to force the multiple friction plates of the upshift brake together (or the piston against the periphery of a primary gear), thereby applying the brake to slow or stop the rotation.

It is important to coordinate actuation of the upshift brake with the complete disengagement of the master clutch. If the upshift brake is applied prior to complete disengagement, the torque being transmitted through the master clutch may cause excessive heating and wear of the upshift brake resulting in premature failure. A delay in actuation of the upshift brake after the master clutch is fully disengaged is undesirable since it defeats the purpose of using a brake in the first place. Moreover, it makes the object of consistent control more difficult for an operator to achieve.

As is well known in the art, coordinated control of the master clutch and the upshift brake can be accomplished by manually coupling the actuators for these mechanisms. However, the change in a master clutch or upshift brake resulting from wear is accompanied by a change in the positional relationship between disengagement of the master clutch and application of the upshift brake. Since brake wear and clutch wear normally occur at different times and rates, and may even proceed in opposite directions, there is no consistent relationship between brake wear and clutch wear. Therefore, it is desirable to maintain a constant relationship between the disengagement position of the clutch and the apply position of the brake for consistent brake application. This requires adjustment of the brake actuator, the clutch actuator, or both.

DISCLOSURE OF THE INVENTION

It is, therefore, an object of the present invention to provide an actuation method that accommodates uncoordinated, disparate designs of master clutches and upshift brakes into a coordinated clutch and/or transmission control system.

It is a more specific object of the present invention to provide apparatus for sequentially coordinating the application of an upshift brake with complete disengagement of a master clutch.

It is an additional object of the present invention to provide apparatus for automatically compensating for wearing of friction material in a master clutch so as to achieve consistent master clutch engagement and disengagement.

A further object of the present invention is to provide apparatus for automatically compensating for wear in a master clutch and an upshift brake so as to achieve consistent application of the upshift brake.

Still another object of the present invention is to provide apparatus for consistent actuation of a master clutch and upshift brake which provides for a single operator motion with an easily discernible option to avoid actuation of the upshift brake.

Still another object of the present invention is to provide a method for consistent hydraulic actuation of a master clutch and upshift brake which includes coupling actuation of the two devices while allowing independent, automatic adjustment.

Still another object of the present invention is to provide for automatically compensating for master clutch wear with apparatus which is external to the rotating members of the clutch.

In carrying out the above object and other objects and features of the present invention, a dual piston actuation cylinder is provided which compensates for wear of the master clutch by automatically varying the amount of hydraulic fluid present in the fluid links which couple the cylinder to the upshift brake and master clutch. A reservoir provides hydraulic fluid to the system through the cylinder to compensate for any change in position of the master clutch release tube, or the upshift brake actuator, while the master clutch actuator is engaged. This is accomplished by exposing a channel passing between the reservoir and cylinder where the channel is exposed only while the master clutch actuator is in the engaged position.

The dual piston cylinder provides for the sequential actuation of the brake and clutch from a single actuator input by utilizing a preloaded spring module which inhibits fluid displacement to a brake from one piston until the other piston has reached a stop which corresponds to clutch disengagement.

The above objects and other objects, features, and advantages of the present invention will be readily appreciated by one of ordinary skill in the art from the following detailed description of the best mode for carrying out the invention when taken in connection with the accompanying drawings.

BEST MODE(S) FOR CARRYING OUT THE INVENTION

Figure 1:
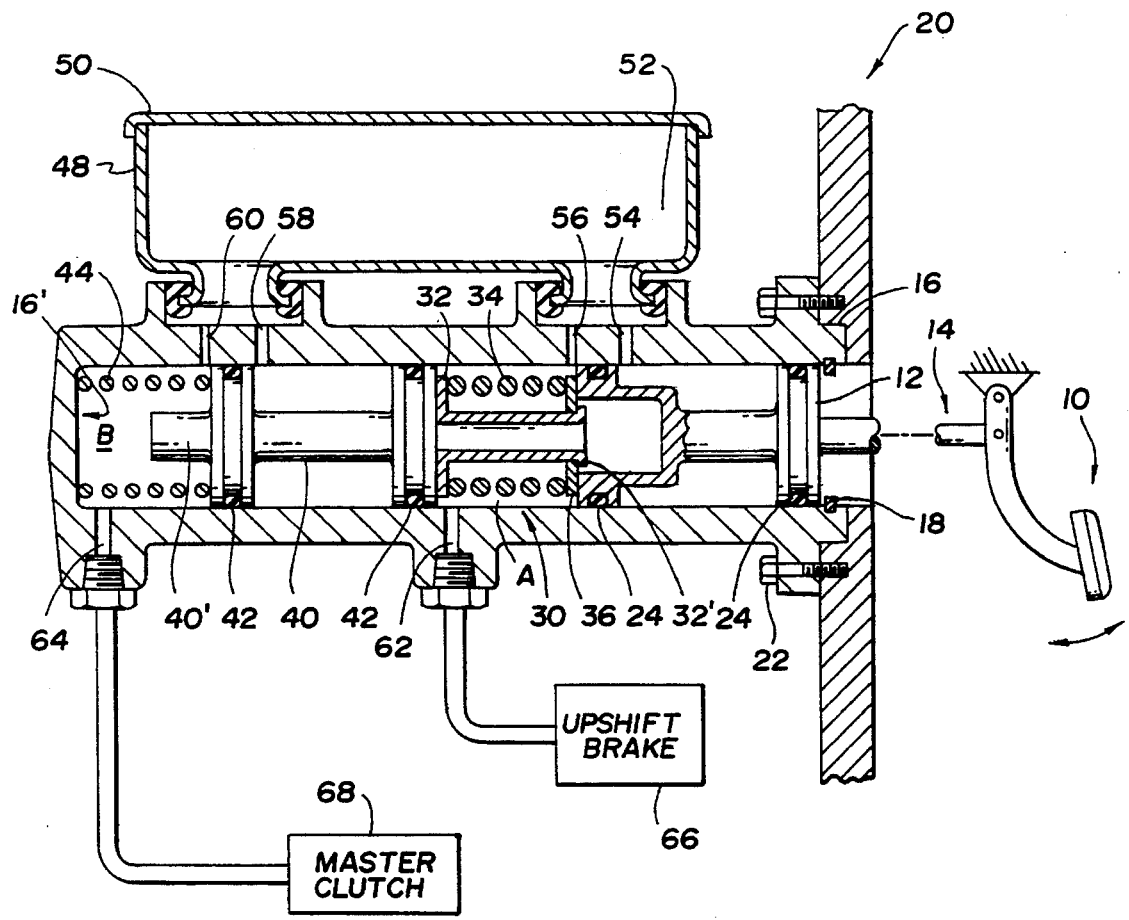
FIG. 1 is a cross-sectional view of a self-adjusting dual piston hydraulic cylinder for actuating an upshift brake upon disengagement of a master clutch according to the present invention.

Referring now to FIG. 1, a cross-sectional view of a self-adjusting dual piston cylinder for actuating an upshift brake upon disengagement of a master clutch is shown. Clutch pedal 10 is mechanically coupled to primary piston 12 via actuation linkage 14. Primary piston 12 is restrained within the bore of cylinder 16 by retaining ring 18. Cylinder 16 is mounted to a stationary portion 20 of a vehicle, such as a vehicle firewall, by fasteners 22. Primary piston 12 contains appropriate seals 24, such as lip seals or O-rings, to inhibit leakage of hydraulic fluid from cylinder 16.

Still referring to FIG. 1, primary piston 12 contacts preloaded spring module, indicated generally by reference numeral 30. Preloaded spring module 30 includes base member 32, primary spring 34, and apply ring 36. Primary spring 34 is preloaded and held in place by apply ring 36 which rests against flange 32' of base member 32. Secondary piston 40 includes appropriate seals 42, such as lip seals or O-rings, as well as a stem 40'. Secondary spring 44 is interposed between secondary piston 40 and master cylinder 16. In one embodiment, secondary spring 44 is forceful enough to cause the pistons and pedal to normally reside in the engaged position limited by snap ring 18. The preload force of spring module 30 exceeds the total force required to disengage the clutch. This total force is the sum of the force from secondary spring 44 and the hydraulic force from the pressure in region A on secondary piston 40.

As also shown in FIG. 1, a reservoir 48 having a removable cover 50 is attached to the top of master cylinder 16 and holds hydraulic fluid 52 which is connected to the system to compensate for changes in the fluid links, as explained in greater detail below. Primary equalization passage 54 allows for pressure equalization due to expansion and contraction of the hydraulic fluid. Primary pressurization passage 56 supplies hydraulic fluid to region A, which is located between primary piston 12 and secondary piston 40, for applying the upshift brake as described below.

Still referring to FIG. 1, passage 56 should be kept small to minimize the wearing of seal 24 as it crosses the passage during disengagement of the master clutch. However, there are several valve designs capable of occluding passage 56 to decouple the fluid link from reservoir 48 which are not susceptible to damage associated with seals passing over holes while the seals are pressurized.

Secondary equalization passage 58 allows for pressure equalization while secondary pressurization passage 60 supplies hydraulic fluid for disengagement of the master clutch, as explained below. Master cylinder 16 also includes an upshift brake actuating passage 62 and a master clutch actuating passage 64 through which hydraulic fluid passes thereby creating a fluid coupling between master cylinder 16 and the respective actuating mechanisms. As is well known, hydraulic pressure created and delivered by master cylinder 16 may be used for direct actuation of upshift brake 66 and master clutch 68. Alternatively, the hydraulic pressure may be used in combination with a slave cylinder and bell cranks to actuate master clutch 68.

In operation, when clutch pedal 10 is depressed, actuation linkage 14 causes an axial motion of primary piston 12. As primary piston 12 begins to move, proximate seal 24 passes over primary pressurization passage 56 thereby sealing region A. Primary piston 12 then exerts an axial force on apply ring 36 of preloaded spring module 30. This force is transferred by primary spring 34 to secondary piston 40 without compression of primary spring 34 since the preload value exceeds the force required to move secondary piston 40. This maintains a substantially constant fluid volume in region A as the primary 12 and secondary 40 pistons, coupled by the fluid volume, move in unison. Thus, region A is not yet pressurized.

Secondary piston 40 moves against the lesser opposing force exerted by secondary spring 44 thereby sealing and pressurizing region B which is located between secondary piston 40 and master cylinder 16. Secondary spring 44 is compressed without significant compression of primary spring 34. The hydraulic pressure generated in region B permits hydraulic fluid to flow from region B through passage 64 so as to disengage master clutch 68 either directly or in combination with a slave cylinder and bell crank, as is known.

With continuing reference to FIG. 1, secondary piston 40 continues moving until stem 40' contacts wall 16' of master cylinder 16. This corresponds to complete disengagement of master clutch 68 and defines the detent position of clutch pedal 10. Once stem 40' contacts wall 16' of master cylinder 16, any additional pedal force exerted via actuating linkage 14 and primary piston 12 will exceed the preload force of primary spring 34 and compress primary spring 34 so as to pressurize region A. The hydraulic pressure generated in region A forces fluid from region A through passage 62 so as to actuate upshift brake 66 which exerts an opposing torque on the rotating elements of the transmission input. As is well known in the art, hydraulic pressure may be used directly or in combination with a slave cylinder and a bell crank to apply upshift brake 66.

Once the force on clutch pedal 10 is removed, the restoring force of primary spring 34 and the hydraulic pressure in region A cause apply ring 36 and primary piston 12 to travel toward their released positions so as to decrease the pressure in region A and release upshift brake 66. Similarly, secondary spring 44 and hydraulic pressure in region B exert a restoring force on secondary piston 40. Note that secondary spring 44 does not begin to decompress until primary spring 34 has attained its original preloaded length and the pressure in region A returns to its original level as primary piston 12 moves away from secondary piston 40. Therefore, the upshift brake 66 releases before secondary piston 40 can move from the clutch disengaged position. As secondary piston 40 returns to its released position, the pressure in region B decreases, so as to engage master clutch 68.

With continuing reference to FIG. 1, as master clutch 68 wears, its actuating mechanism (not specifically illustrated) will return to a slightly different position. This creates either a positive or negative (vacuum) pressure in region B. This results in hydraulic fluid flowing between reservoir 48 and region B via passage 60, so as to compensate for wear. Similarly, any change in position of the actuating mechanism for upshift brake 66 is compensated for by hydraulic fluid 52 which flows between reservoir 48 and region A via passage 56. Thus, reservoir 48 provides for automatic adjustment of the fluid link between primary 12 and secondary 40 pistons, and upshift brake 66 and master clutch 68, respectively.

Figure 2:
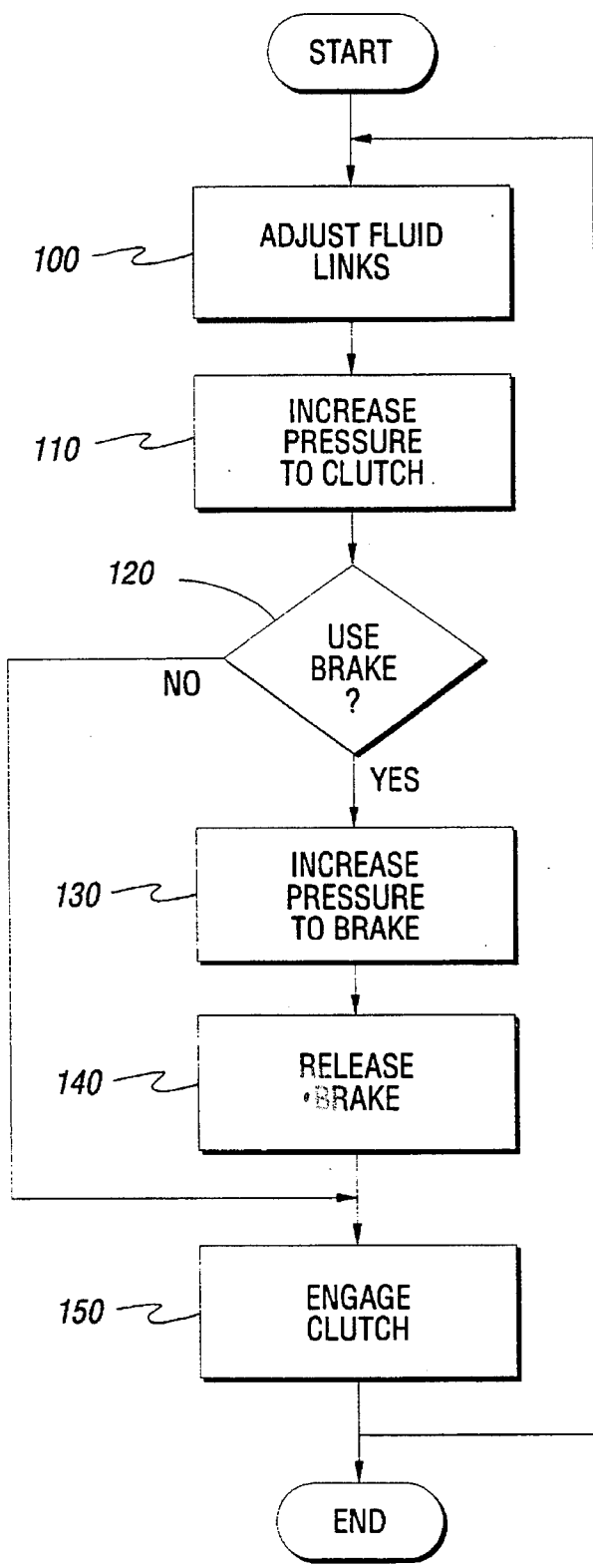
FIG. 2 is a flow chart illustrating the steps in a method for consistently actuating an upshift brake upon disengagement of a master clutch in a sequential manner.

Referring now to FIG. 2, there is shown a flow chart illustrating the steps of a method for consistently actuating an upshift brake upon disengagement of a master clutch according to the present invention. Step 100 includes adjusting the fluid links which actuate the disengagement of the master clutch and the application of the upshift brake. Each fluid link is adjusted automatically by varying the amount of hydraulic fluid in the link to compensate for a change in position of the actuating mechanisms due to wearing of the clutch and brake components. For example, in a typical "pull configuration" type heavy-duty clutch, as the friction material of the master clutch wears, a "shorter" fluid link is necessary for proper engagement and disengagement due to the change in the position of first contact between the discs of the clutch. By coupling each fluid link to a reservoir of hydraulic fluid while the master clutch is engaged, egress (or ingress) of fluid compensates for the change in the "length" (which corresponds to the fluid capacity) of the link. Of course, this step could easily be at the end of a clutch engage/disengage cycle instead of at the beginning of the cycle.

At step 110, the fluid pressure in the fluid link which actuates the disengagement of the master clutch is increased. During this period, the fluid link is decoupled from the reservoir by occluding a connecting passage so that an essentially constant amount of fluid is subjected to a decreasing cylinder volume thereby increasing the fluid pressure and ejection of fluid from the cylinder.

With continuing reference to FIG. 2, step 120 includes a test to determine if it is desirable to utilize the upshift brake. This step may correspond to an operator choosing not to depress a clutch pedal beyond its detent position, or a decision by a robotically controlled system to not actuate the upshift brake. If the upshift brake is to be utilized, the process continues with step 130. Otherwise the process continues with step 150.

Step 130 is performed upon disengagement of the master clutch, wherein the fluid pressure within the fluid link to the upshift brake is increased to actuate the upshift brake. Similar to step 110, this step also includes decoupling the fluid link from the reservoir by occluding a connecting passage. As is known, there are several valve designs capable of occluding a passage to decouple the fluid link from the reservoir which are not susceptible to damage associated with seals passing over holes while the seals are pressurized.

At step 140, the pressure within the fluid link to the upshift brake is decreased, allowing the upshift brake to be released. Thereafter, at step 150, the pressure within the fluid link to the master clutch is decreased allowing the master clutch to engage. The reservoir is once again coupled to the fluid links by exposing the connecting passages. Once the reservoir is coupled, the process repeats with step 100 by adjusting the fluid links. Consistent sequential actuation of the upshift brake upon disengagement of the master clutch is thereby accomplished.

It is understood, of course, that while the form of the invention herein shown and described includes the best mode for carrying out the invention, it is not intended to illustrate all possible forms thereof. It will also be understood that the words used are descriptive rather than limiting, and that various changes may be made without departing from the spirit and scope of the invention disclosed.

What is claimed is:

1. For use in a vehicle powertrain having a master clutch for releasably coupling an engine to an input shaft of a transmission, the transmission including a braking mechanism for braking the input shaft, an apparatus for actuating the braking mechanism upon disengagement of the master clutch, the apparatus comprising:

a housing;

a fluid reservoir attached to the housing and in fluid communication therewith;

a first member disposed within the housing so as to define a first region, the first member being axially translatable within the housing between a clutch-engaged position and a clutch-disengaged position, the first region being in selective fluid communication with the reservoir depending upon the position of the first member;

means for biasing the first member toward the clutch-engaged position;

a second member disposed within the housing so as to define a second region, having a variable volume, between the first and second members, the second member being axially translatable within the housing, the second region being in selective fluid communication with the reservoir depending upon the position of the second member; and means for regulating the volume of the second region, the regulating means disposed within the second region and being operative to maintain a substantially constant volume until the first member is in the clutch-disengaged position, thereafter the regulating means allowing the volume of the second region to decrease so to pressurize the second region to apply the braking mechanism.

2. The apparatus of claim 1 wherein the means for biasing comprises a spring.

3. The apparatus of claim 1 wherein the means for regulating comprises a preloaded spring having a spring force with magnitude greater than a force sufficient to translate the first member to the clutch-disengaged position as determined by the means for biasing.

4. The apparatus of claim 1 wherein the means for regulating comprises:

a base member having first and second ends with a longitudinal center portion extending therebetween, the first end having a first flange which cooperates with the first member, the second end having a second flange;

a spring disposed about the center portion and in contact with the first flange; and an annular apply ring disposed about the center portion and axially movable thereabout, the apply ring being interposed between the spring and the second flange so as to preload the spring, the apply ring also being in contact with the second member.

5. The apparatus of claim 1 wherein the first member includes a stem portion operative to axially contact an interior wall of the housing when the first member is in the clutch-disengaged position so as to prevent further axial translation of the first member.

6. The apparatus of claim 1 further comprising a retaining member in contact with the second member when the second member is in the clutch-engaged position so as to retain the second member within the housing.

7. For use in a vehicle with a powertrain having a master clutch for releasably coupling an engine to an input shaft of a transmission, the transmission including a braking mechanism for braking the input shaft upon disengagement of the master clutch, the vehicle also including means for disengaging the master clutch and actuating the braking mechanism including a cylinder having first and second pistons disposed therein, the pistons defining a region therebetween having a variable fluid volume, a method of consistently controlling actuation of the braking mechanism, the method comprising:

pressurizing a first fluid link with a first volume of fluid, the first link extending between the means for disengaging the master clutch and actuating the braking mechanism and the master clutch, so as to disengage the master clutch;

pressurizing a second fluid link with a second volume of fluid after the master clutch is disengaged, the second link being fluidly coupled to the region and extending between the means for disengaging the master clutch and actuating the braking mechanism, and the braking mechanism, so as to actuate the braking mechanism, wherein the second fluid link is pressurized by axially translating the second piston relative to the first piston so as to decrease the volume of the region while substantially maintaining the quantity of fluid in the second fluid link; and adjusting at least one of the first and second fluid links to compensate for wear of at least one of the master clutch and the braking mechanism so as to provide for consistent actuation of the braking mechanism after disengagement of the master clutch.

8. The method of claim 7 wherein the cylinder also includes a spring disposed within the region, the spring not being significantly compressed by a force necessary to disengage the master clutch.

* * * * *

UNITED STATES PATENT AND TRADEMARK OFFICE
CERTIFICATE OF CORRECTION

PATENT NO. : 5,452,779
DATED : September 26, 1995
INVENTOR(S) : Thomas A. Gee

It is certified that error appears in the above-indentified patent and that said Letters Patent is hereby corrected as shown below:

On the title page, item [56] References Cited
U.S. Patent Documents     After "5,018,353   5/1991" replace "Rugh" with --Pugh--.

Column 6, line 41,     After "be" insert --performed--.

Claim 1, column 7, line 52,     After "so" insert -- as--.

Signed and Sealed this

Ninth Day of January, 1996

Attest:

BRUCE LEHMAN

Attesting Officer     Commissioner of Patents and Trademarks